United States Patent [19]
Vey

[11] 3,791,751
[45] Feb. 12, 1974

[54] ROD REPAIR SPLICE
[75] Inventor: Robert E. Vey, Elburn, Ill.
[73] Assignee: Buffalo Brake Beam Company, Lackawanna, N.Y.
[22] Filed: Jan. 28, 1972
[21] Appl. No.: 221,629

[52] U.S. Cl............................ 403/311, 285/419
[51] Int. Cl............................................. F16d 1/00
[58] Field of Search .... 287/111, 108, DIG. 11, 110; 285/119, 286, 419; 52/726; 339/275 R

[56] References Cited
UNITED STATES PATENTS
1,302,412  4/1919  Murray ............................... 285/286
1,443,579  1/1923  Lippincott .......................... 285/419
1,806,687  5/1931  Hoover ............................... 287/111
1,944,141  1/1934  Stidd .................................... 287/108

Primary Examiner—Andrew V. Kundrat
Attorney, Agent, or Firm—Christel & Bean

[57] ABSTRACT

A rod repair splice having a pair of trough shaped bodies each with a rod embracing and body locating flange at one end thereof. The bodies are oppositely slidably mounted on the rod to be repaired and welded along their opposite longitudinal edges to the peripheral surface of the rod sections.

10 Claims, 7 Drawing Figures

PATENTED FEB 12 1974
3,791,751
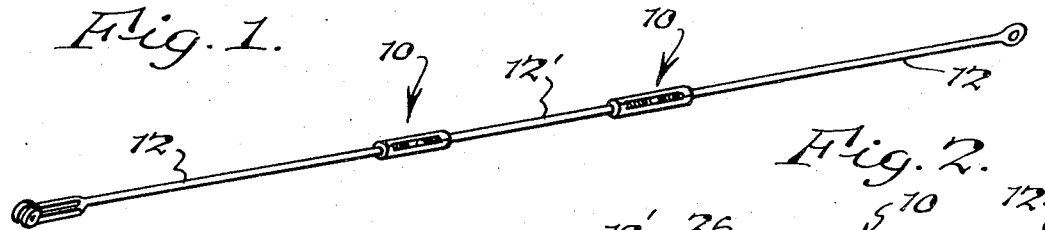
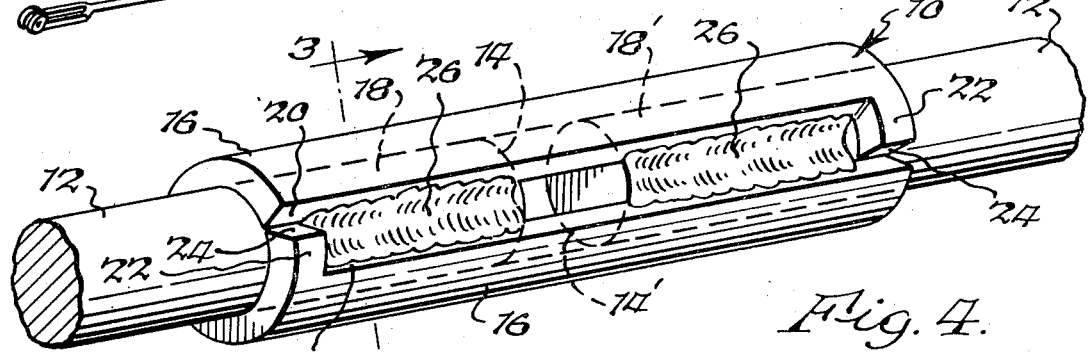
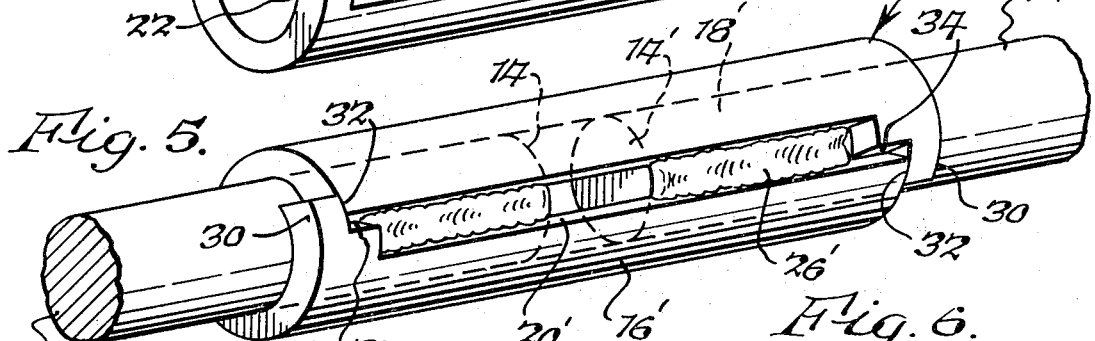
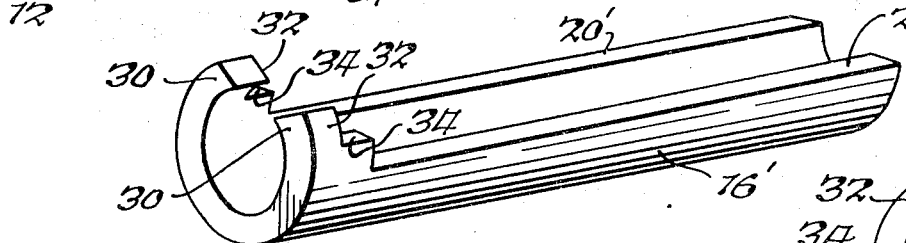
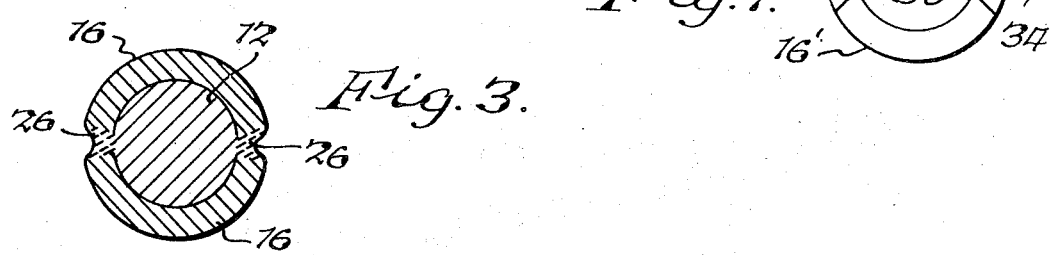

ROD REPAIR SPLICE

BACKGROUND OF THE INVENTION

This invention relates to the splicing art and, more particularly, to a splice for repairing rods and the like.

Actuating metallic pull rods, such as those utilized in connecting linkages for railroad car brake rigging systems for example, are sometimes fractured, damaged or become worn or otherwise weakened somewhere along the lengths thereof and must be either replaced or repaired. If repaired, the damaged or worn portion of the rod is removed and a splice is effected between the adjacent ends of the severed rod sections. Sometimes, the splice is effected by substituting a length of rod for the damaged portion and welding these separate pieces together. Often, the splice merely consists of a piece of tubing slip fitted over the severed ends of these rod sections and peripherally welded at its opposite ends to the rod sections. Splices effected in the above manner are relatively weak at the weldments so that the repaired rod is weaker than the original rod. Also, properly conditioning these rod ends in preparation for an end welding operation, especially where the length of the rod is critical, and peripheral welding itself are difficult to do on the site, and are time consuming. Therefore, repair generally involves removing the damaged rod and transporting it to a remotely located shop, which in itself is relatively expensive and time consuming.

SUMMARY OF THE INVENTION

A primary object of the present invention is to provide an improved rod repair splice which is strong and rigid in construction, rugged, durable and self-locating in use, relatively low in cost, and which can be expeditiously effected in the field.

The rod repair splice of the present invention, as hereinafter described, obviates the prior art disadvantages by providing a splice assembly comprised of a pair of semi-circular trough shaped body members adapted to fit partially about the adjacent end portions of a pair of rod sections, the longitudinal edges of each splice body being spaced equidistantly from the longitudinal edges of the other splice body. Each body member has an arcuate flange at one end thereof having opposite ends projecting beyond the longitudinal edges of the body member and adapted to abut the other body member adjacent the opposite end of the latter. The body members are welded along their longitudinal edges to the peripheral surfaces of the rod end portions to produce a completed splice.

Various other novel features of construction and advantages provided by the rod repair splice of the present invention are pointed out in the following detailed description of certain embodiments thereof considered in conjunction with the accompanying drawing depicting the same wherein like numerals represent like parts throughout the various views.

BRIEF DESCRIPTION OF THE DRAWING FIGURES

FIG. 1 is a perspective view of an elongated rod incorporating the repair splice of this invention;

FIG. 2 is a fragmentary, perspective view, shown on an enlarged scale, of one form of rod repair splice constructed in accordance with this invention;

FIG. 3 is a cross sectional view, on an enlarged scale, taken about on line 3—3 of FIG. 2;

FIG. 4 is a perspective view of one of the splice bodies shown in FIG. 2;

FIG. 5 is a fragmentary, perspective view of another form of rod repair splice of this invention;

FIG. 6 is a perspective view of one of the splice bodies shown in FIG. 5; and

FIG. 7 is an end elevational view of the splice body of FIG. 6.

DETAILED DESCRIPTION OF AN ILLUSTRATIVE EMBODIMENT

Referring now in detail to the illustrative embodiments depicted in the accompanying drawings, there is shown in FIG. 1 a pair of rod repair splices, generally designated 10, of this invention incorporated in a damaged elongated rod 12 such as is employed in a railroad car brake rigging system, for example. Rod 12 is shown in its repaired condition whereby an intermediate piece or length of rod 12' of the same diameter as rod 12 has been substituted for the removed, damaged portion of rod 12, the piece 12' being connected to the adjacent ends of rod 12 by means of the rod repair splices of this invention. As shown in FIG. 2, each rod repair splice 10 embraces the adjacent ends 14 and 14' of the severed rod 12 and piece 12'. These adjacent ends can be slightly spaced, if desired. While the splice of this invention is illustrated as being particularly adapted for repairing solid rods employed in railroad car rigging systems, it should be understood that the utility of the splice of this invention is not limited thereto.

Splice 10 comprises a pair of elongated body members 16 of generally semi-circular trough shape cross sections each having an inner surface adapted to overlie and fit partially about the adjacent end portions 18 and 18' of the rod sections 12 and 12', respectively. Each body member 16 has a lateral, arcuate extent of slightly less then 180° and is provided with opposite beveled edges 20 extending longitudinally thereof. Each body member 16 is provided with arcutae flanges 22 at one end thereof providing a total arcuate extent slightly greater than 180° and terminating in opposite, beveled edges 24 projecting beyond edges 20 of body member 16. Extending flanges 22 through an arc greater than 180° enables body member 16 to be suspended from rod 12 to facilitate the assembly and the welding of body member 16 on rod 12, as will hereinafter be explained. Body members 16 are adapted to be oppositely mounted on rod 12 so that the inner portion of each flange edge 24 of one body member 16 abuts against the inner portion of the longitudinal edge 20 of the other body member 16 adjacent the opposite, flangeless end of the latter as shown in FIG. 2. The opposite beveled edges 24 of flanges 22 form with the opposite beveled edges 20 of body members 16 V-shaped junctures. This arrangement radially locates the major portions of body members 16 and leaves a sufficient space between the adjacent longitudinal edges 20 thereof to form a strong weldment.

After body members 16 are slipped on rod end portions 18 and 18' in the manner illustrated in FIG. 2, body members 16 are welded along edges 20 to the outer surfaces of rod end portions 18 and 18' to form longitudinally extending weldments or weld beads 26 along the junctures or parting lines between portions of the outer surfaces of rod end portions 18 and 18' and the body member edges 20. Thus, body members 16 are rigidly secured to rod end portions 18 and 18' along weldments 26 which are of a substantial length to form a strong and rigid splice for rod 12.

FIGS. 5, 6, and 7 illustrate another form of rod repair splice, generally designated 10', comprising a pair of generally semicircular, trough shaped body members 16' similar to the first described body members 16 but each having flanges 30 at one end extending through a much longer total arc than flanges 22 of body members 16. The inner face of each of these flanges 30 is stepped to form an end abutment surface 32 against which the opposite, flangeless end of the other body member 16' abuts in the assembled relation, as shown in FIG. 5, to longitudinally locate body members 16' relative to each other. In such a nested, assembled relation, body members 16' are longitudinally offset a distance approximating the thickness of the free end of flange 30. Also, the stepped formation defines a beveled shoulder 34 which abuts against the longitudinal edge 20' of the other body member 16' adjacent the flangeless end thereof. In this manner, the major portions of body members 16' are radially located relative to each other to provide substantially wide spaces between adjacent longitudinal edges 20' to form strong weldments 26' therebetween.

A significant feature of this invention is that the severed ends of rod 12 are welded to splice bodies 16 along longitudinally extending weldments 26 of a substantial length to form a strong and rigid composite splice 10, enabling rod 12 to at least withstand the stresses and forces for which it was initially designed. Such longitudinal welds are easier to make than the peripheral welds conventially made and is further facilitated by the beveled edges 20. Also, the weldment length provided in the splice of this invention greatly exceeds the rod periphery, resulting in a stronger repair and the strength of such repaired joints exceeds the initial strength of the rod prior to being damaged. Splices 10 can be attached to rod 12 expeditiously in the field, often without the necessity of removing such rod from its connecting linkage. The arcuate extent of flanges 22 and 30 with the body through more than 180° permits splice bodies 16 and 16' to be suspended from rod 12 and facilitates the securement of bodies 16 and 16' to rod 12. Also, since the adjacent ends of rod 12 and rod piece 12' are not welded together and can be spaced from each other, the effective length of the repaired rod 12 can be easily made equal to the original length of rod 12, regardless of the amount of removal of damaged sections from rod 12.

While normally two splices 10 are employed to repair a damaged railroad car brake rigging connector rod, it should be understood that where a relatively small linear section of rod 12 is removed so that there is no necessity for an additional piece 12', only one splice 10 can be used to embrace the adjacent ends of the severed rod sections. Body members 16 and 16' need not conform exactly to the rod sections, but preferably fit closely thereabout.

Preferred embodiments of this invention having been described and illustrated in detail, it is to be understood that this has been done by way of illustration only.

I claim:

1. A rod repair splice comprising: in combination with a rod to be spliced; a pair of body members of generally trough shaped cross sections adapted to fit partially about the periphery of said rod; each of said body members having opposite, longitudinal edges and at least one flange adjacent at least one end thereof extending arcuately from one of said opposite longitudinal edges thereof; said body members being mounted diametrically opposite each other on the rod so that the flanges thereof are at opposite ends of the splice and the opposite longitudinal edges of each body member are adjacent those of the other body member; said rod being welded to said body members along and between said opposite longitudinal edges to secure said body members to circumferential portions of said rod.

2. A rod repair splice according to claim 1 wherein each of said flanges is provided with an edge abutting a longitudinal edge of the other body member adjacent the other end thereof.

3. A rod repair splice according to claim 1 wherein said opposite edges of each of said body members are beveled and spaced from the opposite edges of the other body member in the assembled relation of said splice.

4. a rod repair splice according to claim 2 wherein said edge of each of said flanges is beveled and forms with the abutting longitudinal opposite edge of said other body member a V-shaped juncture.

5. A rod repair splice according to claim 2 wherein said body members extend through an arc of less than 180° and said flanges further extend said arc to greater than 180°.

6. A rod repair splice according to claim 2 wherein said longitudinal edges of each of said body members are equidistantly spaced from the longitudinal edges of the other body member.

7. A rod repair splice according to claim 1 wherein said body members are longitudinally offset relative to each other.

8. A rod repair splice according to claim 5 wherein each of said flanges is provided with an inner abutment surface against which the opposite, flangeless end of the other body member engages in the assembled relation to longitudinally orient said body members relative to each other.

9. A rod repair splice as set forth in claim 5, wherein said body members are identical and wherein said flanges are on the same radius as the remainder of said members.

10. A rod repair splice according to claim 8 wherein each of said flanges is provided with a beveled shoulder having a portion abutting one of the longitudinal edges of the other body member adjacent the other end thereof to radially orient said body members relative to each other.

* * * * *